US011838248B2

(12) United States Patent
Swildens

(10) Patent No.: US 11,838,248 B2
(45) Date of Patent: *Dec. 5, 2023

(54) MANAGING AND EXECUTING SERVERLESS FUNCTION COMMAND SETS IN A MESSAGING SERVICE

(71) Applicant: DigitalOcean, LLC, New York, NY (US)

(72) Inventor: Eric Sven-Johan Swildens, Los Altos Hills, CA (US)

(73) Assignee: DigitalOcean, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/590,807

(22) Filed: Feb. 1, 2022

(65) Prior Publication Data

US 2022/0158960 A1 May 19, 2022

Related U.S. Application Data

(63) Continuation of application No. 17/102,421, filed on Nov. 23, 2020, now Pat. No. 11,240,185.

(60) Provisional application No. 62/939,545, filed on Nov. 22, 2019.

(51) Int. Cl.
*H04L 51/046* (2022.01)
*H04L 67/02* (2022.01)

(52) U.S. Cl.
CPC ............ *H04L 51/046* (2013.01); *H04L 67/02* (2013.01)

(58) Field of Classification Search
CPC ....... H04L 51/046; H04L 67/02; H04L 51/18; H04L 67/34; G06F 9/45512
See application file for complete search history.

(56) References Cited

U.S. PATENT DOCUMENTS

| 9,584,454 | B2* | 2/2017 | Hull ...................... H04L 51/046 |
| 10,853,061 | B2* | 12/2020 | Doyle ..................... G06F 40/30 |
| 2012/0240062 | A1* | 9/2012 | Passmore ................ H04L 51/52 715/758 |
| 2016/0344671 | A1* | 11/2016 | Hussain ................ H04L 51/046 |
| 2017/0357442 | A1* | 12/2017 | Peterson ................... G06F 9/54 |
| 2021/0026692 | A1* | 1/2021 | Mestery .............. H04L 61/4511 |
| 2021/0160202 | A1 | 5/2021 | Swildens |

OTHER PUBLICATIONS

United States Patent and Trademark Office, U.S. Appl. No. 17/102,421, Non-Final Office Action dated Mar. 4, 2021.
United States Patent and Trademark Office, U.S. Appl. No. 17/102,421, Notice of Allowance dated Sep. 16, 2021.

* cited by examiner

*Primary Examiner* — Benjamin M Thieu
(74) *Attorney, Agent, or Firm* — Shield Intellectual Property PC; Kirk D. Wong

(57) ABSTRACT

A serverless function execution system enables fast, efficient and flexible deployment and execution of serverless functions. User commands are received from external messaging systems that cause functions to be executed. A serverless function associated with the user command is determined and the serverless function is executed in an isolation container at a function computation server. A response from the execution of the serverless function is sent to the external messaging system.

20 Claims, 11 Drawing Sheets

701 - /nf app_create <APP>

Creates an app with the given identifier. The identifier is also the app's command prefix and it must start with a '/'.

702 - /nf app_delete

Deletes the current app

703 - /nf app_list

Lists the available apps

704 - /nf channel_add <CHANNEL> <URL>

Adds an output messaging channel with its associated webhook URL

705 - /nf func_code <FUNC>

Shows a link to the function's code editor

706 - /nf func_create <FUNC> <COMMAND_DEF>

Creates a function associated with the given command definition

707 - /nf func_history <FUNC> [-from <INDEX>]

Shows last 40 log lines for the function

708 - /nf group_create <GROUP>

Creates a group

709 - /nf group_members <GROUP> [+ USER 1] .. [- USER 2] .. [+ USER N]

shows, adds/removes current members

710 - /nf task_create <TASK> <CHANNEL> <COMMAND_EXEC> creates a task to run an executable command to the given output channel

711 - /nf task_schedule <TASK> [WHEN]

shows, sets the schedule when a function runs

Figure 7

801 - /nf secret_create

Shows a link to the Secret Creator interface where secret parameters can be created.

802 - /nf secret_add <name> <encrypted_value>

Adds a secret parameter to the current app

803 - /nf secret_list

Lists the secret parameters in the current app

804 - /nf csm_install <location_name>

Installs a command set from an external location.

805 - /nf csm_uninstall <location_name>

Deletes a command set and all the commands included in the set

806 - /nf csm_create <command_set>

Creates a command set with the given name

807 - /nf csm_commands <command_set> [+ <command>] [- <command>] ...

Adds or removes commands from the command set

808 - /nf csm_localdev

Sets up the development proxy server for remote development of a command.
    Outputs a identifier that can be used on a local development server

Figure 8

MANAGING AND EXECUTING SERVERLESS FUNCTION COMMAND SETS IN A MESSAGING SERVICE

PRIORITY CLAIM

This application claims benefit under 35 U.S.C. § 120 as a Continuation of application Ser. No. 17/102,421, which claims the benefit of U.S. Provisional Application No. 62/939,545, filed Nov. 22, 2019. The entire contents of which is hereby incorporated by reference as if fully set forth herein. Applicant hereby rescinds any disclaimer of claim scope in the parent application(s) or the prosecution history thereof and advise the USPTO that the claims in this application may be broader than any claim in the parent application(s).

TECHNOLOGY

The present invention relates generally to executing serverless functions, and in particular, to a serverless function execution system using messaging services.

BACKGROUND

In the recent decade, online cloud-based office collaboration and messaging service communication platforms have become a popular way for corporate employees to communicate. These platforms are typically centered around a core messaging system that allows individual users to communicate directly to each other or in channels containing a group of users. Some popular existing messaging service communication platforms include Slack, Microsoft Teams, Cisco's Webex, WeChat and MatterMost.

Many of the aforementioned communication platforms include the ability to create custom commands in the messaging platform that call out to an API (application programming interface), passing the custom command executed as input. The API callout endpoint is most typically represented as a REST (REpresentational State Transfer) HTTPS (Hypertext Transfer Protocol Secure) URI (Uniform Resource Identifier).

Software running on a server and listening for API calls to the given HTTPS URI can then receive a custom command when typed in the messaging platform as a textual message. The software receiving the message can examine the custom command received and execute a custom operation based on the contents of the command by executing software code.

A set of custom commands can be bundled as an "app". In Slack, for example, such an app is known as a "Slack app". Apps can be installed into one or more sets of communication channels, allowing the users of the channels to execute custom server code by typing custom commands.

Developers typically implement custom command APIs by adding code to a server process that runs on a network connected computer and that listens for incoming networking API requests. Server code can be developed in any of a variety of computer languages including Golang, Java, Python or JavaScript, to name a few. The tools used to develop the server code are external and separate from the messaging service communication platforms themselves.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

The present invention is illustrated by way of example, and not by way of limitation, in the figures of the accompanying drawings and in which like reference numerals refer to similar elements and in which:

FIG. 7 illustrates a sample subset of system administration messaging commands, according to an embodiment of the invention;

FIG. 8 illustrates a sample subset of secret value management and command set management commands, according to an embodiment of the invention;

DETAILED DESCRIPTION

Figure 1:
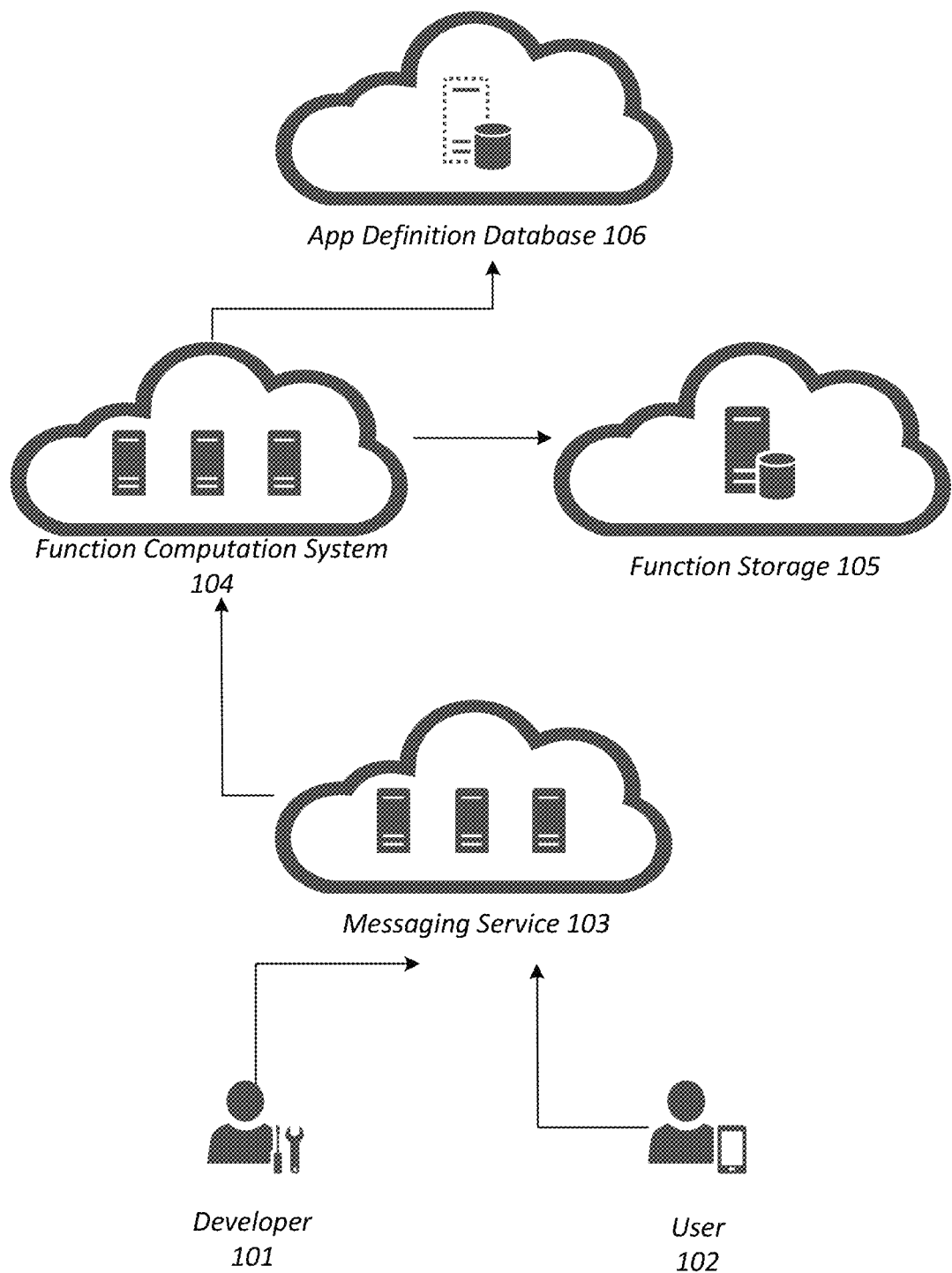
FIG. 1 illustrates a diagram showing developers creating and users executing serverless functions in a messaging service utilizing the system, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Another set of technologies that has emerged in the latest decade are those that fall under the programming paradigms of serverless computing and Function as a service (Faas). Software development platforms have been created that allow developers to run functions as independent units with API endpoints, without the need for them to be developed in conjunction with encompassing server software code. When these technologies are fully utilized, there is typically no need for operational management of a server process or server hardware, leading to the term "serverless" to describe them. Examples of these types of serverless development platforms include Google Cloud Functions, IBM Cloud Functions (based on IBM/Apache Openwhisk), Microsoft Azure Functions and Amazon's AWS Lambda functions.

Faas serverless computing platforms can be utilized to create function code for custom command APIs in a messaging service. As with server code development, the development of code using Faas-based platforms is done outside of the messaging service itself. The process of developing custom commands by developing code completely external to a messaging system can be arduous as the connections between the two separate platforms must be stitched together by a developer.

It would be useful to employ a Faas platform as the basis for a custom command function execution platform but to allow for more effective code development and debugging by creating a tightly integrated system where development is enabled through textual message commands within the messaging service itself. An ability to create and manage Faas functions as groups, without requiring the piecemeal connection of each function to the messaging service, would be further advantageous.

An embodiment allows an administrator various levels of access control for different commands and provides a log history of commands executed. Access control in the system can be managed for individual users or users could be grouped and managed in terms of their respective groups. The development system could additionally be fully managed within the messaging service using textual commands Faas function return values could automatically be routed to the messaging service as output in a channel.

An embodiment enables the development and sharing of sets of command definitions and their associated source code. The system enables the development of commands and debugging of command source code on computers separate from the serverless platform itself, such as on a developer's own laptop or desktop computer. The system supports scoped encrypted and unencrypted key/value pairs to allow configuration values, API keys and secret values to remain separate from command source code.

The system is secure and ensures security by fully isolating executing functions, associated with custom commands, from each other. The system also automatically scales if demand or computational requirements increase.

A serverless function execution system enabling the development, management and execution of serverless functions in a messaging service is disclosed. Serverless functions are created and managed by issuing textual messaging commands in the messaging service, unlike other development systems where the creation and management of functions is performed outside of the messaging service itself. Messaging service commands and associated Faas serverless functions are managed in groups where a group of functions, settings and values constitutes an "app".

An app administrator can issue textual message commands to set access rights for users of the messaging service with respect to the app and app's functions. Access rights that may be granted include the ability to change function code, the ability to execute command functions or the ability to administer a group of functions. Access rights can be set for individual users or groups of users.

In the system presented, an app defining a group of functions is associated with a command prefix. Individual functions are associated with subcommands. Commands that execute functions contain a prefix and a subcommand.

For example, the messaging command:
/devops host_create myhost.com
is associated with an app named "/devops" and, when entered into the messaging service, will execute function code associated with the subcommand "host_create". The "myhost.com" value is a parameter passed to the underlying function code associated with "host_create".

Internal to the system, the "/devops" prefix and app name is, itself, associated with an app routing function. Routing functions are used as an entry point to allow developers to manage a group of functions under a single entry point.

The routing function for app commands run by users is identical for all apps. The app routing function uses a data structure derived from an app definition stored in an app definition database to determine how to route app commands to their functions.

The app definition contains the definition of all the commands associated with the app including their parameter value types and function API locations. The definition also contains all other app related information including, but not limited to, mappings of users to their access rights, schedules for functions that run on a schedule and function computation system and messaging authorization tokens.

The development and management of apps is performed by issuing textual commands in the messaging service. For example, an app may be created with:
/nf app_create/devops The "/nf" prefix is associated with the administration app that is used to create and manage apps according to the system disclosed. The "app_create" subcommand tells the system to create an app associated with a prefix of "/devops". Subcommands can then be added to the app:
/nf func_create "say <msg>"

An administrator entering this messaging service command causes a function to be created associated with subcommand "say" that takes a single parameter "<msg>" as input.

Creating a subcommand and its associated function adds an entry for the subcommand and function to the app definition in the app definition database. It also creates a function code stub and stores that code on a storage device in function storage. The stub of function code may be created in a programming language such as JavaScript.

Executing "/nf func_create" to create a function returns a link location that can be used to edit the function code for the subcommand. The link location may be a web enabled link that, when clicked, opens a web browser window with a web-based code editor along with the source code for the function.

The administrative user creating the function may allow access so other users of the messaging service can edit the source code for the function by giving them developer access to the function source code with a command such as:
/nf func_coders say+@sarah This administrative command adds the messaging user "@sarah" as a developer for the function "say". Sarah could then use the command:
/nf func_code say
to display the link allowing her to edit the function code. The link can be clickable, allowing the developer to quickly launch a web-based code editor to edit the associated function code. The function code itself can perform whatever custom operations the developer wants. Values returned from the function appear as output in the messaging service.

Function debugging can be enabled in the web-based code editor or, if sufficient error information is displayed when executing a function that contains an error, in the messaging service itself. When debugging in the messaging service, debugging can be performed by attempting to execute the command and associated function by entering its associated textual command and observing any resulting error output in the messaging service.

After creating the "say" command above and given access to run the command, a user could type the following in the messaging service:

/devops say hello to execute the function code associated with the "say" command (subcommand). In this example, the function associated with "say" is passed a parameter of "hello" as input. As the "hello" parameter is associated with the "<msg>" definition of the function, the receiving code can read the function by looking at the "msg" input parameter.

In this manner, an administrative developer can create an app associated with a command prefix, in this case /devops, and a set of subcommands associated with functions under that prefix. In this example, just one subcommand was created, the "say" subcommand. The "say" subcommand is associated with function code that is executed when the full command "/devops say . . . " is typed in the messaging service. The creation, development and management of apps and functions is performed within the messaging service itself through textual messaging service commands.

Internally, the "/devops" command is directed, via the messaging service, through a routing function. The routing function has a data structure derived from an app definition database that contains the routing information for the "say" command. The routing information includes the location of the function code for the "say" command. The routing function routes the command from the messaging service to the specific function code associated with the command. Both the routing function and function code are executed in a Faas serverless framework function computation system that utilizes isolation containers to isolate one executing function from other executing functions in the system.

The administration app itself may be built using the same command system it enables and may be enabled by its own, internal, routing function associated with the administration app command prefix.

The system additionally supports the creation of encrypted, secret parameter values where parameter values may be encrypted using a web-based interface and then added to an app to appear as parameters passed in to the one or more function(s) in the app that they have been encrypted for. Values can be encrypted using a web-based interface outside of the messaging service and encrypted against keys associated with a specific app (group of functions) or function. The encrypted values can then be added to an app with messaging service commands where only the functions that have keys to decrypt the encrypted values are able to decrypt those values. This is useful for managing API keys to other services that function code may need to access.

The messaging service and routing function can use shared secret key encryption to ensure that only the messaging service is making the call to attempt to execute the function. Routing functions and the functions it dispatches to can also utilize shared secret key encryption to ensure that individual app functions are only called by a routing function.

Alternatively, public/private key encryption could be used to authenticate a function caller, be it a messaging service or routing function. JWT (JSON web tokens) can be utilized to securely transmit parameters and return values between the messaging service and routing function and/or between the routing function and the function it dispatches to.

Functions can be executed by a user entering a textual message in the messaging service or on a schedule by an administrator issuing a command in the messaging service that sets up a function to run at scheduled times. For example:

/nf schedule_create t2#general "say hi"
/nf schedule_rate t1 24hr would cause the function associated with the "say" subcommand to be run every 24 hours. When the function is executed, it will be passed the parameter "hi". The "#general" value specifies the channel the function will write output to.

App administrators can also configure a function to be made public in the messaging service to allow the function to be called based on an external webhook triggering event.

An app may be installed as a "bot" in a messaging service, causing all messages from a given channel to be passed to the app's routing function. The routing function, in turn, can look for messages with the app associated command prefix to dispatch commands to their associated functions.

The system includes log history including a history of administrative commands that have been run and a history of executed functions. The logs may include the identity of the user that initiated the action, the time of the action and the time it took to execute the action.

The system allows definitions of commands and their associated source code to be grouped as "command sets". A command set may be internal or external. An internal command set is a set of messaging system commands, defined in the system, grouped as a named set. An external command set is a named grouping of command definitions and their associated source code that exists outside of the system.

An external specification file defines the commands in an external command set, such as the name of each command and the parameters each command takes and includes links to the source code for each command. The external specification file may be stored at a network accessible location and shared with other users. For example, an external specification file may be shared on a public site (e.g., via GitHub, etc.), distributed among users, etc. A user may download the external specification from the public site to his system. The command set from the external specification file is loaded into the system by executing an installation command, passing the address of that location. In addition to installing command sets by network location, command sets may be installed by giving a single name that maps to a file that, in turn, maps to a network location.

To aid the development of command sets, a developer can utilize a proxy development system that includes a development proxy that is part of the system and a developer proxy client process running on the developer's local machine. When run by the developer, the developer proxy client running on the developer's machine connects to the development proxy that is part of the system. When app commands are run in the messaging service that are not defined in the app definition database, the system will contact the development proxy to attempt to execute the command. The development proxy then contacts the developer proxy client to attempt to run the respective command.

The developer proxy client, running on the developer's local machine, can then check a local command set definition file to see if the given app command is defined in that file. If it defined in the file, the command can be run locally by executing local command source code. Any response resulting from the execution of the source code can be returned to the development proxy, which returns the response back to the function computation system which, in turn, returns the response for output in the messaging service. When a developer has completed testing and debugging command definitions and command source code on their local machine, they can issue an administrative command that causes the source and command definition to be installed in the system via the developer proxy client and development proxy.

To further enable command sets, encrypted secret parameters can be stored in the system as key/value data pairs along with an associated command set scope. These key/value pairs are stored encrypted in the app definition database. When a command is invoked, the secret values associated with that command's command set or app are loaded to be decrypted and passed to the command function. Secret values that are scoped to a command set are then only visible to the commands in that command set. Without a scope, secret values are global to a specific app. As stated previously, in an embodiment, encrypted values are automatically decrypted by the serverless function execution system for use in command source code where they appear as input parameters. In addition to secret values, key/value pairs that are stored in plain-text, unencrypted, can be stored by the system in the app definition database as well. Like secret values, the unencrypted key/value pairs can be scoped to an app (global values) or scoped to specific commands sets in an app. These values would be typically used to store configuration values that should be kept outside of command source code.

Internal to the system, a Faas serverless function computation subsystem performs the actual execution of routing functions, administrative functions and app functions. The computation system utilizes function isolation containers to prevent an executing function from being able to directly access or modify unauthorized data or processes external to the isolation container. A function isolation container invoker manages a set of function isolation containers in which functions are executed, creating and destroying containers as needed and managing container initialization and the container environments required to execute functions.

The Faas serverless computation system can run on a set of function computation servers that may be physically represented as dedicated computer hardware devices with a CPU, memory and, optionally, storage, or may be represented as a virtual server or as a server process operating in an isolation container. A virtual server is one where a single hardware computer device appears as many, independent servers. An isolation container is an execution environment that isolates a running process and resources from other running processes and resources running on a hardware device, in a virtual machine or in another container. Docker, LXD and Windows Containers are three examples of technology enabling isolation containers. Isolation containers may also be implemented utilizing unikernels.

The system utilizes namespaces within the function computation system to separate apps and their respective function code from each other. The use of different namespaces for an app prevents naming conflicts between apps and additionally prevents one app from accessing another's resources.

The use of separate namespaces also enables a developer to directly develop function code outside of the messaging system environment and web based code editor. As a namespace and its associated authorization key is created for each app on the function computation system, that namespace and authorization key can be given to a developer, allowing them to develop function code external to the messaging system. While the web based code editor may allow a limited set of functionality, restricting it to a single language such as JavaScript and/or a single set of add-on libraries, developing functions directly on the function computation system may not have those same restrictions.

The system also allows an administrator to specify create commands that are routed to API endpoints external to the function computation system. Utilizing this functionality allows an administrator to create and manage commands associated with external functions within the messaging service. Return values from calls to external APIs are converted into readable text to be presented in the messaging service as a textual message.

The advantages, aspects and alternatives of this invention will become apparent to those of ordinary skill in the art by reading the following detailed description, with reference, where appropriate, to the accompanying figures.

I. General Overview

A serverless function execution system enabling the development, management and execution of serverless functions in a messaging service is disclosed. Functions in the system are stored as code that is executable by issuing textual commands in the messaging service. Additional textual commands exist to run functions in accordance with a schedule or at a given rate. Function results are output to the messaging service.

A textual command prefix is utilized to identify a group of functions. Function groups are created, managed and administered by administrative users. Administration includes issuing textual commands in the messaging service to grant or restrict access to messaging service users regarding their ability to run and develop functions. Users can be given a group identity, allowing their access rights to be managed as a group.

User commands with a given command prefix are dispatched through a routing function that runs on a computation system that utilizes function isolation containers to prevent an executing function from being able to directly access or modify unauthorized data or processes external to the isolation container. A function isolation container invoker manages a set of function isolation containers in which functions are executed, creating and destroying containers as needed and managing container initialization and the container environments required to execute functions.

The routing function, in turn, executes a function associated with the command on the same computation system, utilizing function isolation containers. Separate computation system namespaces are used to isolate different function groups from each other on the computation system.

The system supports grouping textual messaging system commands into named command sets. Command definitions and command source code for a named command set can be stored and made available at a network location, allowing an administrative or developer user of the messaging system to load and manage a set of textual commands as a named set. To aid the development of command sets, a developer can utilize a proxy development system that includes a proxy server and a local server that a developer can run locally on a machine separate from the serverless function execution system. The proxy development system allows a developer to develop and test command source code running on a machine external to the serverless function system.

Key/value data pairs can be stored in the system, including values stored in encrypted format, so they are scoped and only visible to specific command sets. Encrypted values may be automatically decrypted by the serverless function execution system for use in command source code.

The embodied invention enables the development, management and execution of Faas serverless functions that are executed in response to textual commands in a messaging service. A system according to the invention is sent messaging service textual commands A routing function parses the commands to determine a corresponding function to execute along with any associated parameters. The routing function then dispatches to a serverless function thus identified, passing the parsed values as input parameters. Values returned from the function are output into the messaging service by the routing function.

The system is administered using textual commands in the messaging service. The function computation system utilizes an invoker and isolation containers to ensure the scalability and security of the system.

In addition to executing functions based on textual commands, the system can execute serverless functions on a schedule or at an interval rate. Values returned from a function executed in this manner are posted as output into the messaging service. Functions can also be executed based on webhook trigger events with results being output to the messaging service in the same manner I. Messaging Service Commands Utilizing the system disclosed, an administrative developer can issue textual commands in a messaging service to develop, manage and maintain a set of functions that are executed in conjunction with the messaging service. The set of custom functions may be associated with textual commands where, when a user types the command in the messaging service, the system dispatches the command to one of the set of custom developed functions.

In the system disclosed, a group of functions and their associated properties is known as an "app". An app is associated with a textual command prefix. As an example, an administrative user could issue the following command in the messaging service to create an app:

/nf app_create/math

The prefix "/math" identifies the app and is also the command prefix for the app. The app_create command itself may return by displaying the URI location of an API endpoint for the /math command as output to the messaging service. The administrative user could then use that URI location to connect the messaging service to the API endpoint for the app.

After creating an app, an administrative user can use administrative commands in the messaging service to create subcommands associated with custom function code. This command creates a function associated with the subcommand "mul" that takes 2 parameter values as input:

/nf func_create mul <value1><value2>

The system keeps track of a current app for an administrative user so the administrative user does not need to specify the associated app on func_create administrative commands.

When the command prefix and subcommand are entered into the messaging interface by a user of the messaging service, it causes the associated custom function to execute. For example, the function code associated with the mul command created above could be executed by entering the following in the messaging service. In this example, the created function will be passed 2 parameter values as input: 1 and 2:

/math mul 1 2

When a command and associated function are created with the func_create command, stub function code is created for the function and the func_create command returns a link to a code editor that can be clicked to allow immediate editing of the function code associated with the command One example of a stub JavaScript function that could be created for newly created functions is:

```
/*
@param {object} args list of arguments
@return {{body: SBody}} Http response
*/
function main(args) {
  return {
    body: {
      text: JSON.stringify(args, null, 2)
    }
  };
}
```

This example stub simply returns the passed-in arguments as a string. The return value will end up displayed as output in the messaging service.

Continuing with the example, if the function creator opens the code editor to edit the stub code, the code could be modified to multiply the two input values and return the result. The result returned would automatically be displayed in the messaging service, allowing users a way to get the result of multiplying two numbers by typing a command into the messaging area, like a conversation channel, of a messaging service.

In the system disclosed, administrative users can set access rights to users to allow or disallow them to run specified commands. For example, the following command allows a user "@tim" to run the "mul" command and associated function:

/nf func_runners mul+@tim

Administrative users also can set access rights to allow users to develop function code associated with a command Administrators can also give access rights to other users to become administrators themselves.

In addition to setting access rights for individual users, an administrative user can create a group of users and then set access rights for the entire group of users in one command. For example, the following command creates a group called "students", adds a user "@tim" to the group and then allows all users that are part of the students group to run the "mul" command and its associated function:

/nf group_create students
/nf group_add students+@tim
/nf func_runners mul+students To maintain and manage apps, the system automatically maintains log history of user actions and function execution. Administrative users can execute administrative commands in the messaging service to get performance statistics for functions run and can issue commands in the messaging service to get a log history showing which users executed which functions.

For example, the following administrative command can be used to display the recent history of users who have run the "mul" command and its associated function:

/nf func_history mul

When a user executes a function that results in an error condition, the information about the error is returned to be displayed in the messaging service. If the error is in the function source code, the error will include the line numbers of the error and a stack trace, if applicable. This behavior is useful for developers creating functions as they can perform basic debugging in the messaging service itself.

FIG. 7 displays a subset of the system's messaging service administrative commands Additional administrative commands include commands to delete apps, delete functions, set additional access rights, set and manage secret parameter values, create connections to messaging service APIs, create task functions and schedule when they should run, commands to manage security and API tokens, among others.

II. Component Architecture

The embodied invention enables an administrative developer to issue textual commands in a messaging service to develop, manage and maintain a set of functions that are executed in response to users typing commands in that messaging service. The system is comprised of a serverless function execution system, a set of Faas serverless functions, a database and storage devices in a computer network that work in association with a messaging service. According to the invention, a function computation system responds to requests to execute functions and invokes functions itself based on messaging service commands, events or timers.

FIG. 1 shows one possible embodiment of a representative system present in a computer network. In the system, a developer 101 can issue commands in a messaging service 103 that cause functions to be executed in function computation system 104. To execute a function, function computation system 104 loads function source code from function store 105. Administrative functions create and update definitions in an app definition database 106.

Representative messaging services 103 include Slack, Microsoft Teams, Cisco's Webex, WeChat and MatterMost. Developer 101 and user 103 are both users of messaging service 103. Representative function computation systems 104 include the Nimbella serverless platform as well as Google Cloud Functions, IBM Cloud Functions, Microsoft Azure Functions and Amazon's AWS Lambda functions.

Servers part of function computation system 104 may be physically represented as dedicated computer hardware devices with a CPU, memory and, optionally, storage, or may be represented as a virtual server or as a server process operating in an isolation container. A virtual server is one where a single hardware computer device appears as many, independent servers. An isolation container is an execution environment that isolates a running process and resources from other running processes and resources running on a hardware device, in a virtual machine or in another container. Docker, LXD and Windows Containers are three examples of technology enabling isolation containers. Isolation containers may also be implemented utilizing unikernels.

According to the invention, the app definition database 106 may be a relational SQL database running on a server with associated data. Representative SQL databases include PostgreSQL and MySQL. App database definition 106 contains tables with user, app, function, access rights, group and scheduling data. App definitions include the mapping of apps to their functions and the mapping of message service commands to functions. The definition also includes any URI addresses, authentication tokens and authorization keys the app function code needs to connect to and utilize messaging service 103 and function computation system 104.

According to the invention, developer 101 creates an app by typing a command in messaging service 103. The command is attached to an administrative function in the system that executes in function computation system 104. Code for the administrative functions is stored in function storage 105. When creating an app, the app creation administrative function adds records defining the app to app definition database 106. An app is associated with a command prefix and after creating the app, the command prefix is associated with the app's routing function in messaging service 103, allowing the app's routing function to execute in function computation system 104 when the prefix is typed by a user in the messaging service.

After developer 101 creates an app, the developer can create functions associated with subcommands by typing administrative commands into messaging service 103. Creating functions updates the app definition in app definition database 106 to include a mapping of the subcommand to the newly created function location. Stub source code for the newly created function is stored function storage 105. The code can then be edited by the developer to perform custom actions.

When user 102 types a command with the given app command prefix into messaging service 103, the app routing function associated with the prefix is executed in function computation system 104. The app routing function uses the mapping of app subcommands to functions in app definition database 106 to determine the appropriate function code to execute. The routing function then causes that function to be loaded from function storage 105 and executed in function computation system 104. The routing function takes any return value from the function executed and sends it to messaging service 103 to be output in the messaging service.

III. Computation and Storage

Figure 2:
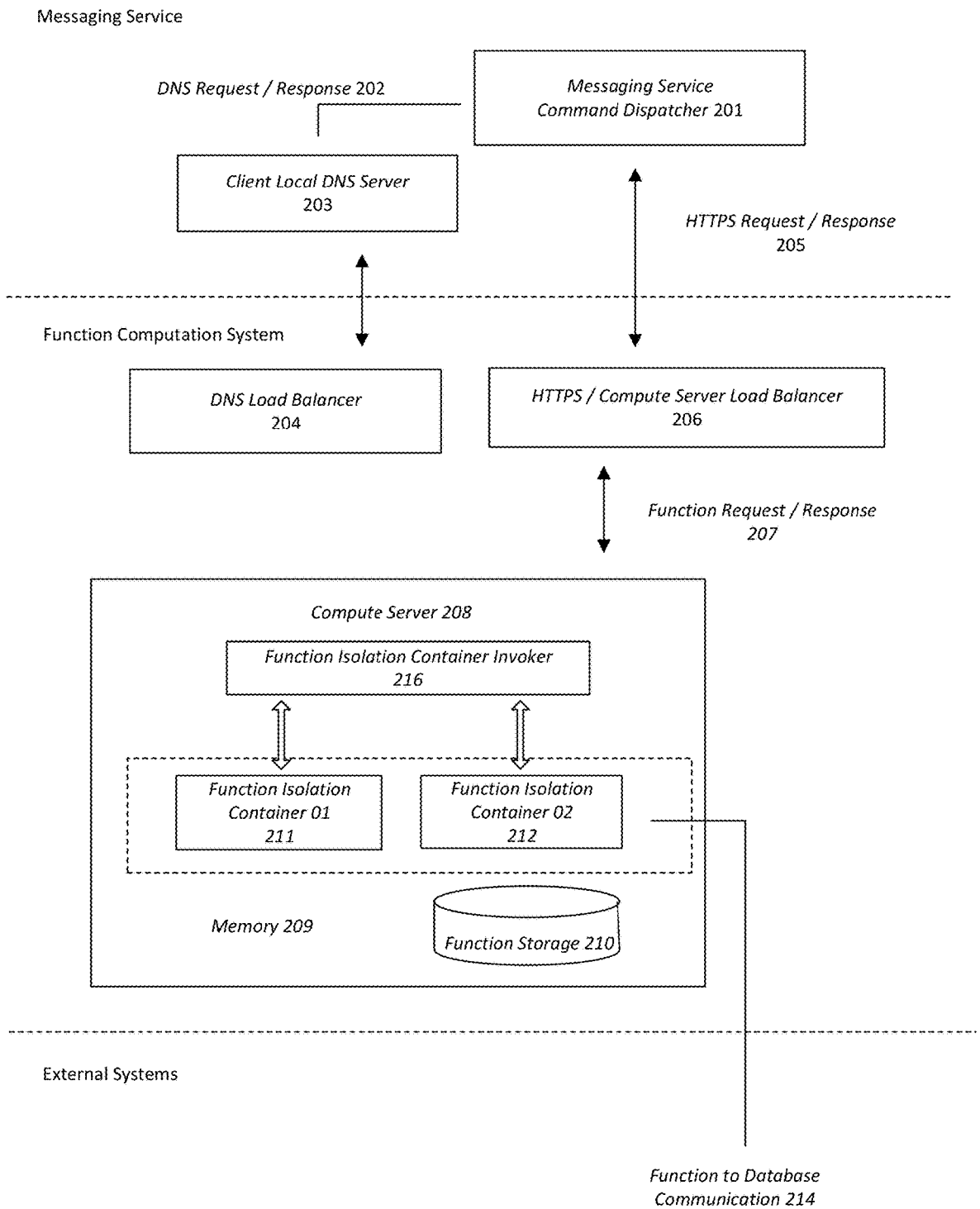
FIG. 2 illustrates a functional diagram displaying the architecture of the computation system that utilizes isolation containers to execute functions, according to an embodiment of the invention.

FIG. 2 shows an embodiment of the function computation system and associated processes in more detail as it relates to the execution of a function invoked by a messaging service command. In FIG. 2, a message entered into the messaging service is processed by the messaging service command dispatcher 201.

Administrative command code, user command code and function dispatcher code are all executed by the function computation system in an equivalent manner.

In the embodiment, the system includes a function computation system component that utilizes DNS and HTTPS load balancing, invokers and isolation container technology to allow for the scalablity and security of function execution in the system.

When an administrator types an administrative command in the messaging service, the command dispatcher 201 processes the message and, based on its prefix, initiates contact with an HTTPS API endpoint associated with that command prefix.

The initiation process begins with hostname resolution. To resolve the hostname of the API endpoint that points to the function computation system, the messaging service command dispatcher 201 will make DNS request 202 to the client local DNS server 203 associated with the messaging service command dispatcher 201.

Assuming the function computation system is available at a DNS hostname of "fcs.nlm.com", the local DNS server 203, in turn, makes requests to the ".com" DNS servers in the Internet to determine the authoritative DNS server for "nlm.com". The authoritative set of servers is returned to client local DNS server 203 by the ".com" servers. Local DNS server 203 then makes a request to resolve "fcs.nlm.com" to DNS load balancer 204, a DNS server that is part of the function computation system and that has been assigned to be authoritative for the "nlm.com" domain in the ".com" server registry.

The DNS load balancing server 204 system monitors the servers associated with the function computation system and will return a compute server IP address to the client local DNS server that can best execute the function associated with the hostname "fcs.nlm.com" depending on a variety of variables. Those variables can include proximity and/or latency to the requester (the dispatcher server initiating the request 201) or latency close to the requester (client local DNS server 203) and/or function compute server availability and current resource utilization. The set of best compute server IP addresses is then returned by client local DNS server 203 as part of a DNS response 202 to the messaging system command dispatcher 201.

After obtaining one or more IP addresses for compute servers, messaging service command dispatcher 201 will select one to connect with and establish an HTTPS connection with that server by IP address. The compute server associated with the IP address is a virtual compute server in that it is a server that is routed to through a HTTPS compute server load balancer 206. HTTPS load balancer 206 presents a virtual IP address and compute server to the Internet that maps to a number of local compute servers and IP addresses in a local cluster of servers. This mapping may be performed by utilizing a Nginx server as a load balancing server, using a Haproxy load balancing server setup, using a Linux Virtual Server load balancing setup or similar.

Load balancing server 206 chooses a compute server 208 to fulfill the function execution request based on variables including the availability of the possible compute servers, their current resource utilization in terms of CPU, memory and network resources and their latency relating to resources that may be needed to execute the function given in the request.

After determining the best compute server 208 to contact, compute server load balancer 206 passes request 205 to the chosen compute server 208 by proxying the request 207.

After receiving request 207, function isolation container invoker 216 running in compute server 208 first looks for an existing function isolation container that can be utilized to execute the given function. If a previously created isolation container such as container 211 is suitable, it can be utilized to execute the given function. In this case, isolation container 211 is currently executing another function so a new isolation container 212 is created by isolation container invoker 216. The isolation container itself may be a Docker container, LXC (Linux Containers), Windows container, a unikernel based isolation unit, Hyper-V container or similar.

The container isolation system prevents the function executing within it from accessing unauthorized memory 209 or unauthorized storage 210 regions of compute server 208. Compute server 208 may be a virtual or physical server. The isolation container invoker and containers may execute within an isolation container themselves.

A container execution environment is loaded or configured into container 212 by container invoker 216 prior to function execution. After obtaining the function source code from function storage 210 and obtaining an isolation container 212 with an appropriate environment, container invoker loads the function source into the container and executes it. As part of function invocation, if parameters are included as part of the function execution request, they are passed when invoking the function.

During function execution, the function executing in container 212 may access other data sources such as database 214 to obtain data that allows it to calculate an appropriate response. Alternative data sources the function may access include machine learning models, web pages, social media feeds, weather feeds, etc.

Both administrative functions and user functions execute through a routing function. In an embodiment, a messaging service command contains an app prefix and a subcommand along with parameters. The function computation system first executes a routing function associated with the command prefix then that routing function executes a function specific to the subcommand following the command prefix. Both functions utilize the function computation system detailed above to execute.

When a function executing in isolation container 212 has computed a response, it returns the response to container invoker 216. Container invoker 216, in turn, returns the response 207 to compute server load balancer 206. It, in turn, returns the response 205 to the caller.

In the event the caller is a routing function, the return value is kept by the routing function to return as an output message to its caller. In the event the caller of the routing function is the messaging service dispatcher 201, the returned value is displayed as output in the messaging service.

In the event the caller is a scheduled event timer, the routing function will take the return value from the function it calls and post it to a channel as output in the messaging service. To obtain channel credentials, the routing function can obtain credential information from the app definition database 106.

IV. Command Routing

Figure 3:
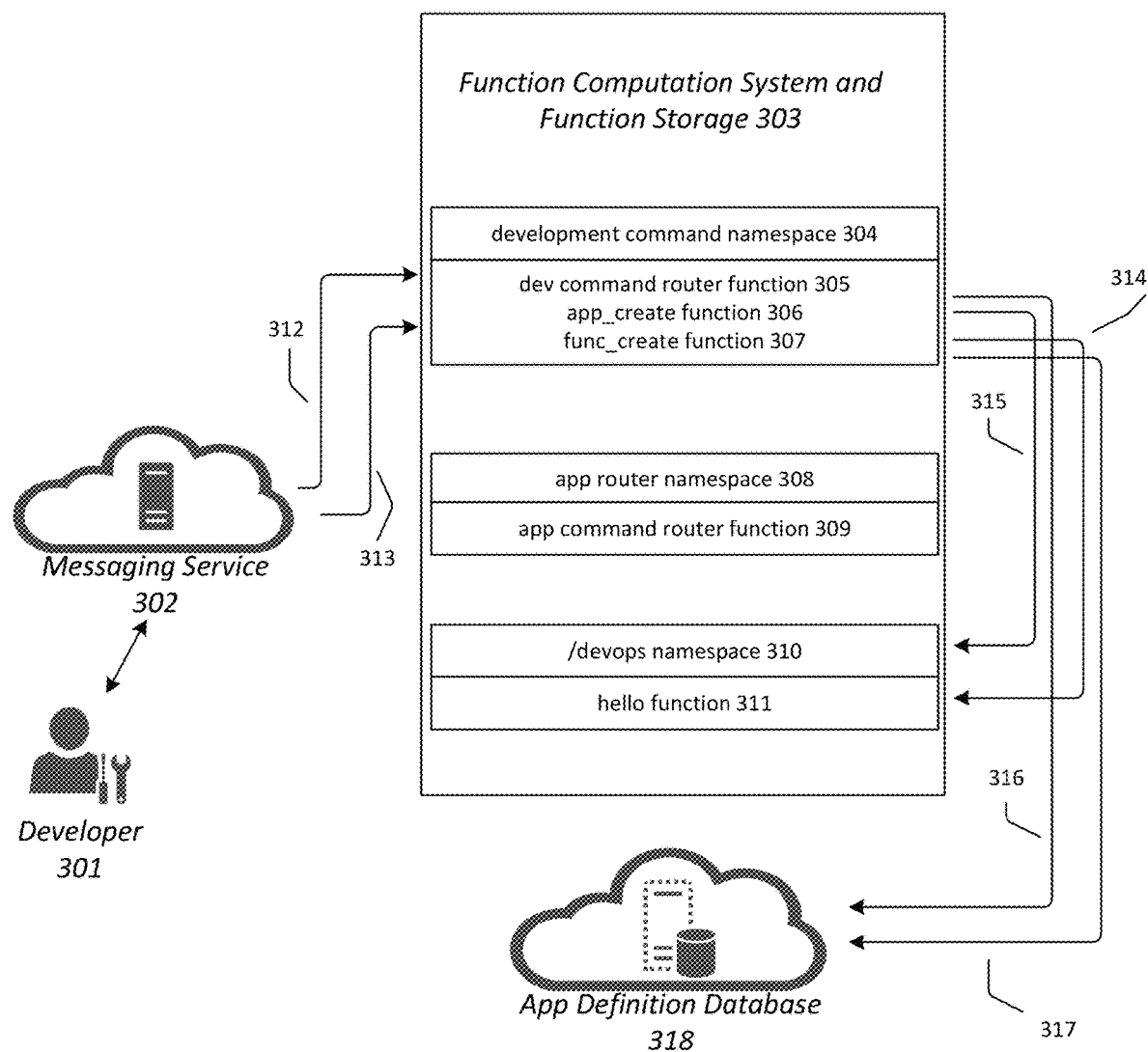
FIG. 3 illustrates a functional diagram showing a developer creating an app and app subcommand, according to an embodiment of the invention.
Figure 5:
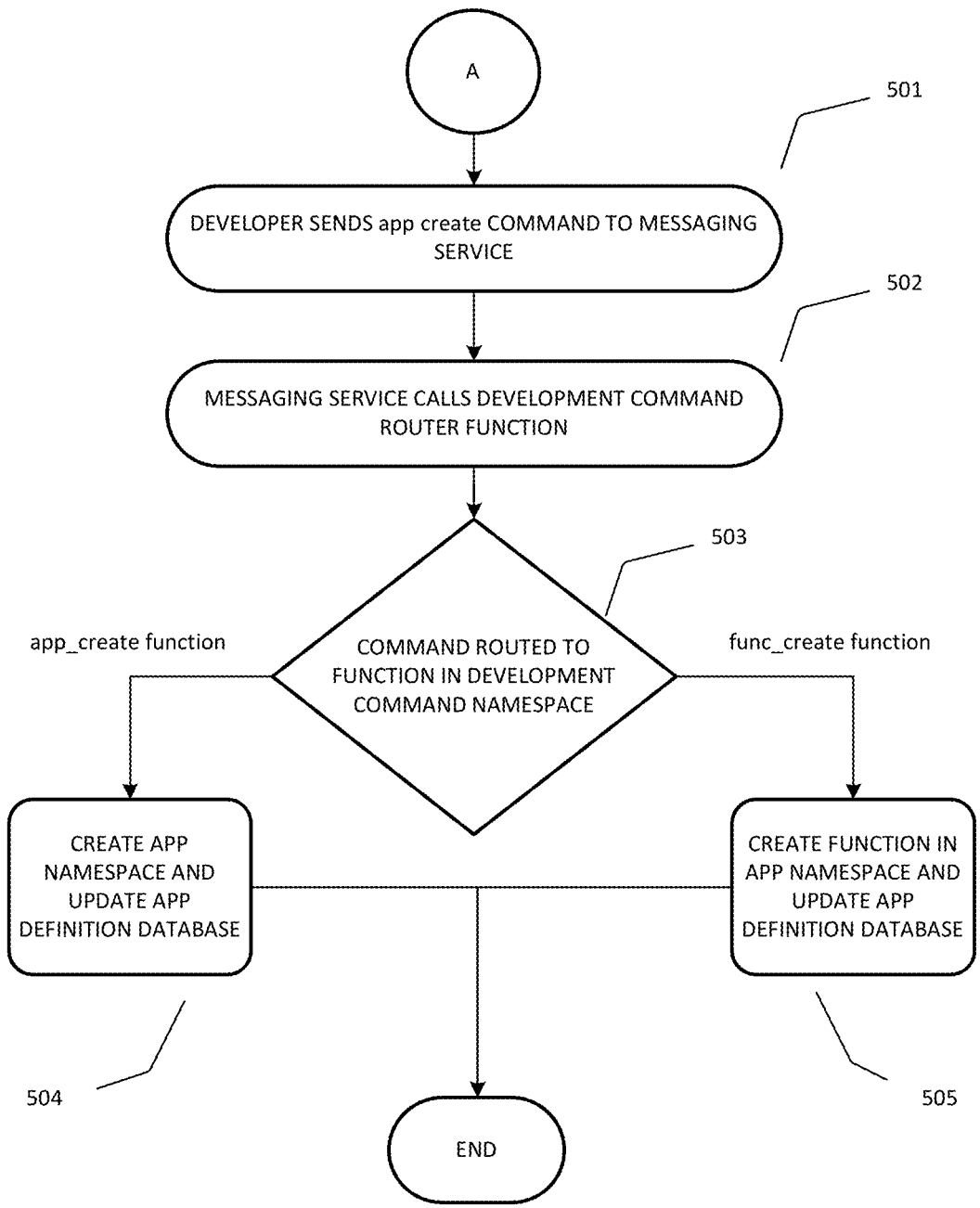
FIG. 5 illustrates a flowchart showing the creation of an app and an app subcommand, according to an embodiment of the invention.

FIG. 3 shows how the system processes messaging service 302 commands from a developer 301 to create an app and an app subcommand in the system. FIG. 5 contains a flowchart of the same process.

To create an app, developer or administrative user 301 enters an "app_create" message into messaging service 302, 501 with a command prefix associated with app administration commands Messaging service 302 connects 502 to the function computation system 303 by its API endpoint which has been associated with the administration command prefix.

The API endpoint is a reference to a routing function 305 in function computation system 303. Upon receiving a textual command 312 from messaging service 302, the function computation system passes the command as an input parameter to routing function 305. Routing function 305 exists in development command namespace 304, ensuring administration code is fully separated from custom app function code such as 309 and 311 contained in their respective namespaces 308 and 310.

Upon receiving an app_create request, router function 305 parses the request to determine where it should route the request to along with any parameters and then routes the request 503 by having function computation system 303 execute app_create function 306. Assuming the app_create function is executing to create an app associated with the prefix "/devops", app_create function 306 will create 315, 504 a new "/devops" namespace 310. After creating the namespace, app_create function 306 updates 316 tables in the app definition database 318 to add a definition for the "/devops" app. The app_create function 306 also updates a static data structure containing the data associated with the app from the app definition database 318 and associates it with the "/devops" namespace in the function computation system.

Upon successful completion of app creation, the app_create function 306 returns a successful value to development command router function 305 which, in turn, returns a successful message to messaging service 302 to appear in the messaging service as output. Following app creation, developer 301 can configure the message service to connect to app command router function 309 when the app prefix is typed in messaging service 302. Alternative, the app_create function 306 can perform that step automatically, before returning, by invoking a programming API in messaging service 302 to do the same.

To create a custom function in the "/devops" app, the developer 301 or administrative user enters 501 a "func_create" message into messaging service 302 with a command prefix associated with administration commands. As with the "app_create" command, messaging service 302 connects 502 to the function computation system 303 via its API endpoint.

After the command is received and passed as input to routing function 305, routing function 305 routes the request by having function computation system 303 execute 503 func_create function 307. Assuming the func_create function is creating a subcommand and associated function called "hello", func_create function 307 will create 314, 505 stub function code for a hello function 311 in the /devops namespace 310 that is associated with the /devops app. JavaScript is one possible representative programming language for stub function code 311. An alternative programming language for generated stub function code may be specified by a developer as a setting associated with the app.

The func_create function 307 then updates 317 the app definition database 318 to include a hello subcommand and a mapping to its associated function 311 as part of the /devops app. The function definition in the app definition database includes any source code location references necessary for the app command routing function 309 to locate newly created function 311.

Upon successful function creation, the func_create function 307 returns a successful value to development command router function 305 which, in turn, returns a successful message to messaging service 302 to appear in the messaging service as output to developer 301.

Figure 4:
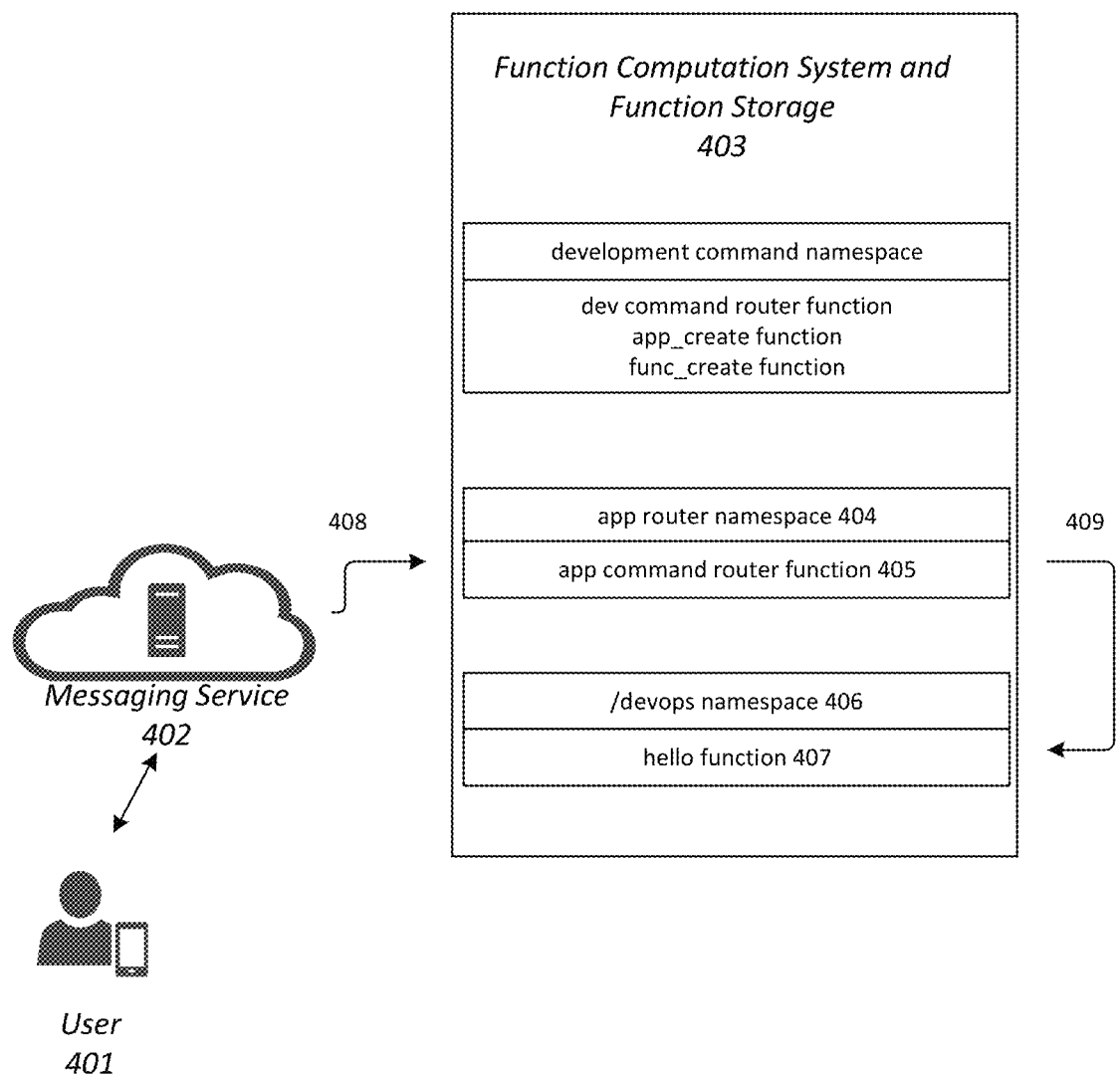
FIG. 4 illustrates a functional diagram showing a user executing an app subcommand, according to an embodiment of the invention.
Figure 6:
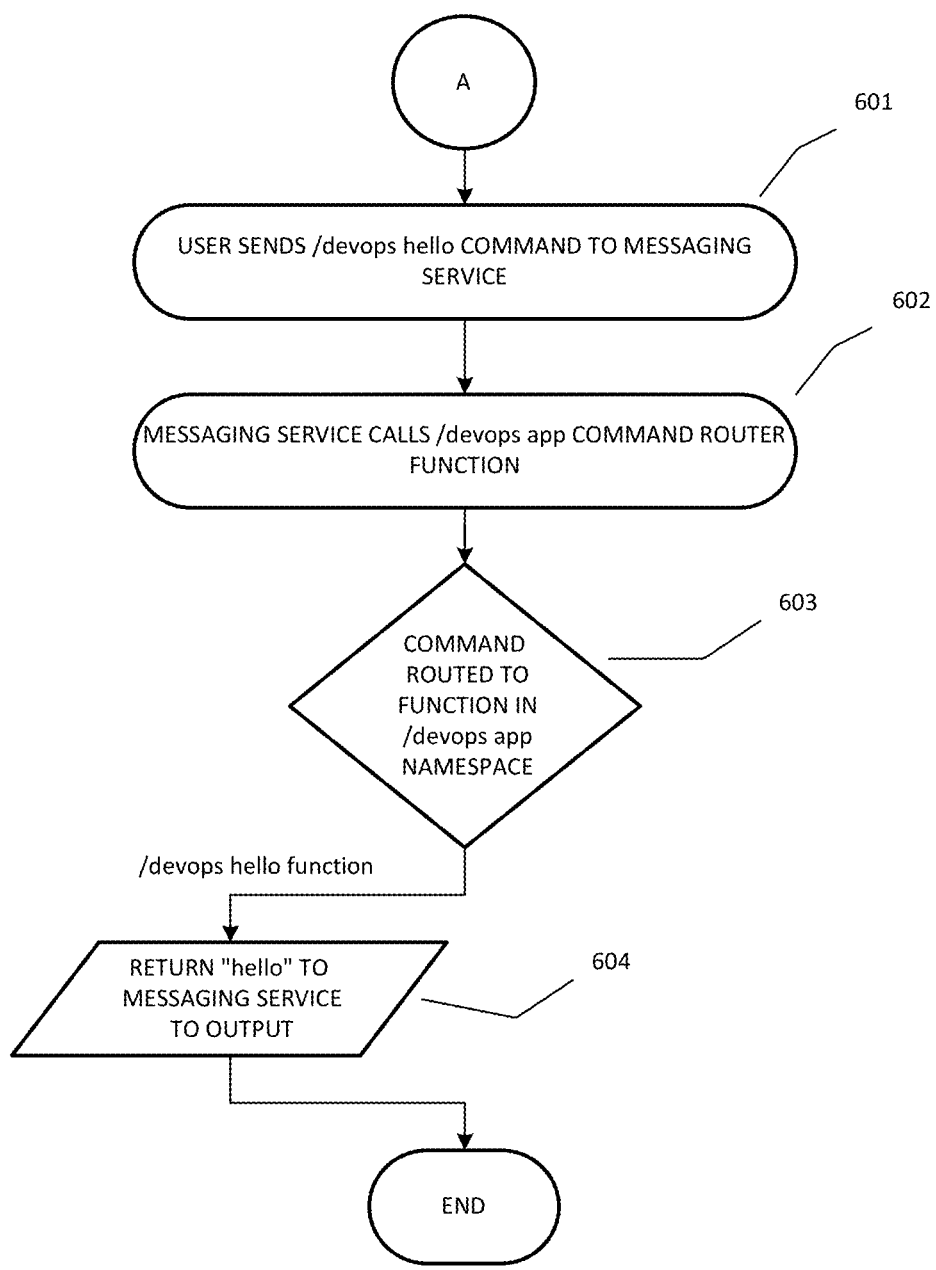
FIG. 6 illustrates a flowchart showing the execution of an app subcommand, according to an embodiment of the invention.

FIG. 4 shows how the system processes messaging service 402 commands from a user 401 to cause custom functions to execute. FIG. 6 contains a flowchart of the same process.

To run a custom function, user 401 enters a command 601 with the command prefix associated with the app along with the name of the function to run and any associated parameters. To run the /devops app hello function created above, passing a parameter of "message", user 401 could enter "/devops hello message" into the messaging service.

When messaging service 402 receives the command from the user, it will connect 408, 602 to the function computation system 403 by the API endpoint that has been associated with the "/devops" app. The API endpoint is a reference to a routing function 405 in function computation system 403.

The app command router 405 then inspects the static data structure created earlier by the app_create command and associated with /devops namespace 404 to determine the function and function location associated with the /devops subcommand. As the subcommand is "hello" in this example, app command router function 405 will cause 409, 603 the function computation system 403 to execute hello function 407 in /devops namespace 406.

If the code for the hello function simply returns "hello", that value is returned to app command router function 405 which, in turn, returns the value 604 for output in messaging service 402.

The hello function is illustrative of a simplest possible function. Custom functions created using the system will typically perform more complex tasks including calling external APIs, querying databases and/or solving complex problems when processing messaging system commands from users.

V. Administrative Commands

An embodiment contains additional commands to develop, manage and maintain custom functions associated with custom commands in a messaging service. FIG. 7 displays a set of basic commands available in an embodiment.

The embodiment includes messaging system commands to create apps 701 and to create subcommands associated with function code 706. Function code can be edited by running a command that displays a link to a function code editor that can be used to edit the function's code directly 705.

Administrative commands are available to set access rights associated with running and developing functions. Commands are also available to grant users access as app administrators. Groups of users can be created 708 and users added or removed to/from those groups 709. Access rights can be set on an individual user or group basis. Access rights and group information is maintained in data tables in the app definition database.

Commands are available to delete an app 702 and to delete functions and groups. The commands to delete apps, functions and groups remove the respective data from the app definition database. When a function or app is removed, optionally, the function code associated with the app or function can also be removed from function storage.

Functions can be made to run on a schedule using task commands Functions that run as tasks generate asynchronous output to the messaging service. Tasks can be created 710 and then given a schedule to run 711. The schedule can take CRON format or a rate can be set for the task, such as "run every 10 minutes". The list of tasks and schedules is stored in the app definition database and task function scheduling itself is performed by the function computation system.

Channel commands, such as commands that create mappings to URI endpoints to post results 704, allow an asynchronously running function to post into a channel in a messaging service using a channel API endpoint Channel information including names of channels and their API webhook endpoints are stored in the app definition database.

Apps 703, functions, channels, tasks and group members can be listed. The output from these commands is generated by querying the app definition database.

An embodiment also includes commands to display and manage logs associated with administrative commands and function execution. Commands to show the basic execution log of a function 707 is available. Log history is also available to show recent administration commands run by a user or for an app as a whole. Function performance and availability statistics is additionally available via administrative commands Log information may be stored by the system in a data store such as ElasticSearch or Splunk. Alternatively, logs could be stored in a key value store such as AWS DynamoDB or MongoDB if complex index-based searches are not required. In either case, as a function is executed or as a command is run, a log line is written to the appropriate data store. A command to display log history simply queries that data store to display log information.

VI. Command Sets

In an embodiment, administrative commands are available to create named groups of commands called "command sets". The embodiment of the system contains an app definition database 106 where app data, including messaging system command definitions and mappings of commands to source code function locations, is stored. Command set definitions, including their name and list of commands contained in each set, is also stored in app definition database 106.

A command set may be internal or external. The commands included in an internal command set are typically a subset of the set of commands in an app. Administrative commands are available to manage an internal command set including commands to add or remove commands from the set, create an external definition of the internal command set and delete the set. The following are representative administrative commands that can be entered into the messaging service to create an internal command set and add 2 commands to the set:

/nf csm_create myset
/nf csm_commands myset+command1+command2

FIG. 8 includes the definition for the csm_create 806 and csm_commands 807 commands. Running these commands updates the command set definition table and a command set member table in app definition database 106 to add the command set and command members of the set.

An external command set is a named grouping of command definitions and their associated source code that exists outside of the system. An external specification file defines the commands in an external command set, such as the name of each command and the parameters each command takes and includes links to the source code for each command. The external specification file may be stored at a network accessible location and the command set loaded by giving the address of that location. The external specification file may be shared at the network accessible location where a user can view the sets of command definitions and their associated source code. The following is a representative YAML format command set external definition:

sourceBasePath: https://a.b.com/src
commands:
  print:
    sourcePath: /command1.js
    description: The first command
    parameters:secx
      name: msg
  contact:
    sourcePath: /contact.js
    description: contacts a user
    parameters
      name: user The above definition defines two commands. The first command, a "print" command, takes a <msg> parameter as input. The second command "contact" takes a <user> parameter as input. The network path to the source code of the first command is the concatenation of the sourceBasePath and sourcePath for the command:

https://a.b.com/src/command1.js

An external command set may be installed into the system using an administrative command. This is a representative administrative command that installs an external command set from an external YAML format command set definition:

/nf csm_install https:/a.b.com/myset.yaml

The installation of a command set loads the command set definition from its network location, creates definitions for the commands defined in the set and stores the new command and command set definitions in app definition database 106. Installation of a command set also loads and installs the associated command source code into function storage 105.

In addition to installing command sets by network location, command sets may be installed by giving a single name. For example, a single-word "billing" command set that contains billing related commands may be installed with:

/nf csm_install billing

To install the single-word "billing" command set, the system loads a global mapping file stored at a fixed network location that contains mappings of single names to the network location of each respective single-word command set. The single-world command set is then loaded from that location using the same process for loading a command set specified by network location. An administrative command is available to reload a command set, which reloads the definition and source code of the command set to update it in the app definition database 106 and function storage 105.

A command is also available to uninstall an external command set which deletes the definition of the set from app definition database 106 and each command's associated source code from function storage 105. FIG. 8 includes the definition for the csm_install 804 and csm_uninstall 805 administrative commands VII. Scoped Values and Scoped Secret Values To further enable command sets, encrypted secret parameters or unencrypted parameters can be stored in the system as key/value data pairs along with an optional command set scope. These key/value pairs, with their values encrypted or unencrypted, are stored in the app definition database 106. When an app command is invoked in the messaging service 103, the key/value pairs associated with that app or command's command set are loaded from app definition database 106 to be decrypted and passed to the command function source loaded from function storage 105 and executed by the function computation system 104.

Key/value pairs without a scope are global to an app and passed to all command functions that are part of the app. Key/value pairs that are scoped to a command set are only passed to command functions that are included in that command set. When a command is executed, the set of global key/value pairs and any key/value pairs scoped to the command set of the command are passed to the command function. Without a scope, secret values are global to a specific app.

As stated previously, in an embodiment, encrypted values are automatically decrypted by the serverless function execution system for use in command source code where they appear as input parameters. Like secret values, unencrypted key/value pairs can be global to an app (no scope) or scoped to specific commands sets in an app. When command source code is executed, these key/value pairs also appear as input parameters. These values would be typically used to store configuration values that should be kept outside of command source code.

Administrative commands can be run in the messaging service to create secret values. A representative messaging service command to create secret values could be:

/nf secret_create

Figure 9:
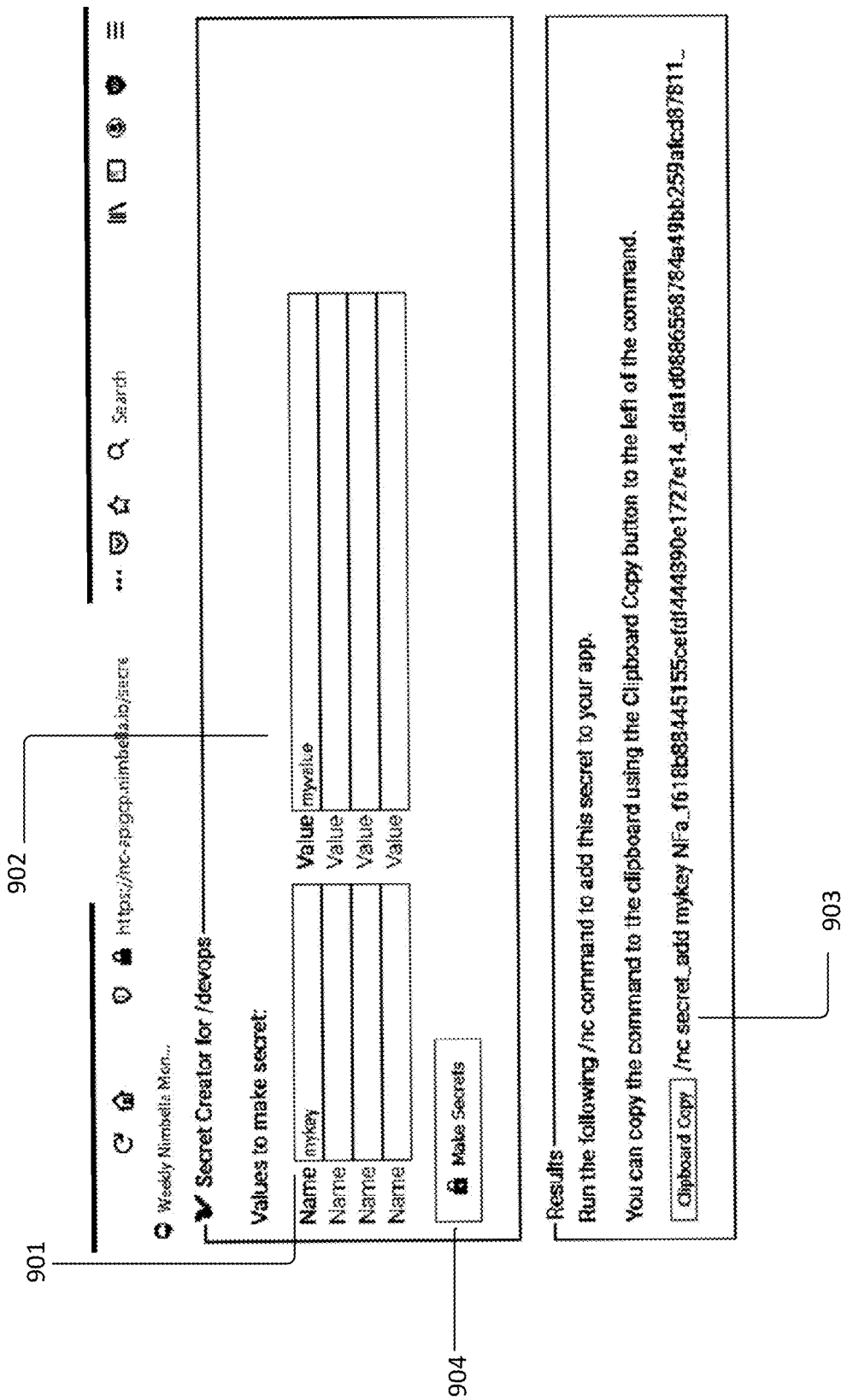
FIG. 9 illustrates a representative user-interface for the creation of secret key/value pairs, according to an embodiment of the invention.
Figure 10:
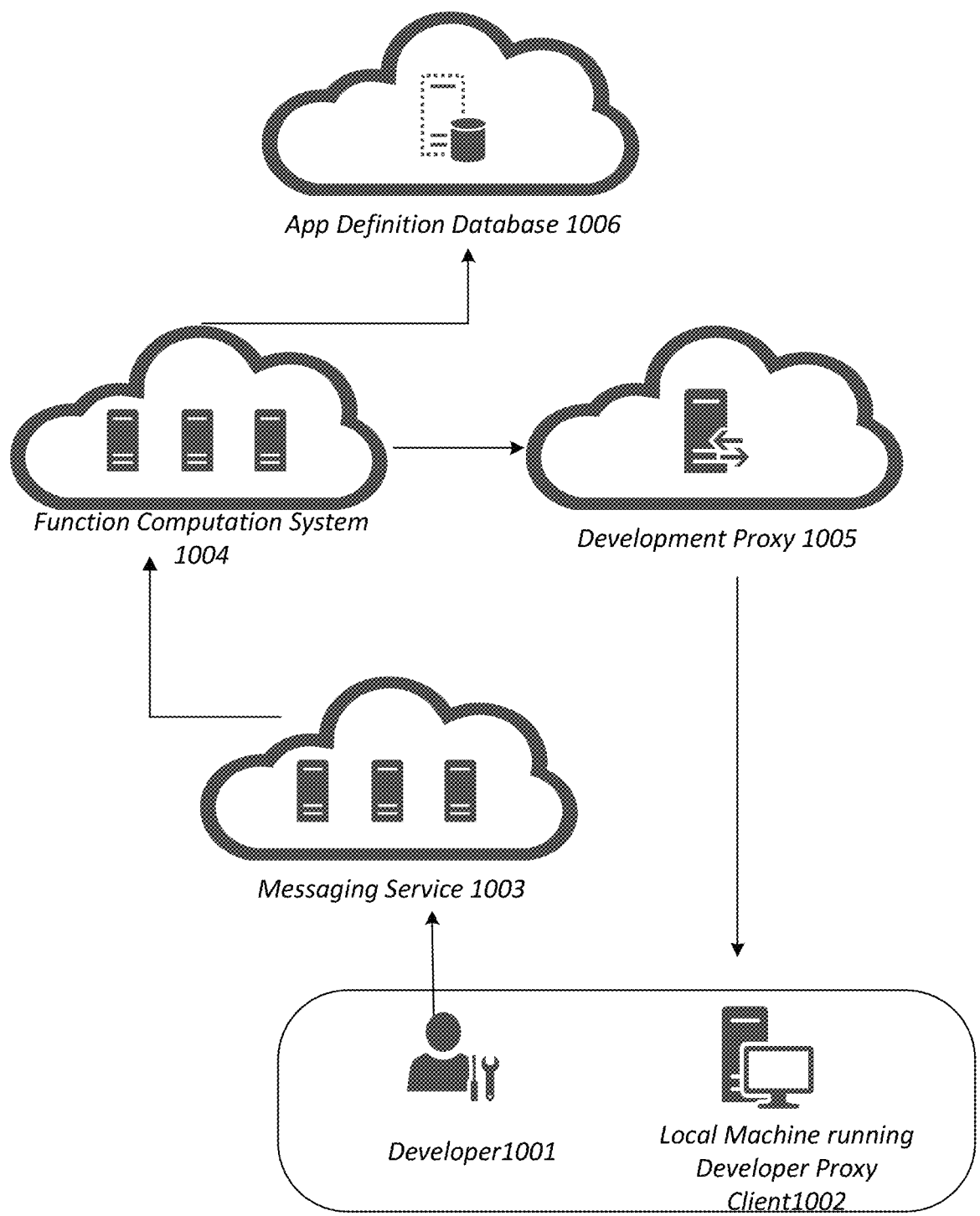
FIG. 10 illustrates a diagram showing a software developer using a proxy development system to develop a set of commands, according to an embodiment of the invention.

Running the secret create 801 command outputs a link to a web-based interface that allows the creation of multiple key/value pairs for the app. A representative user-interface to create encrypted key/value pairs is shown in FIG. 9. The interface allows a user to enter key/value pairs by name 901 and value 902. When the user is done entering values, they can click a button 904, which causes the administrative commands that create the secret values 903 in the messaging service to appear below. These commands can be copied and pasted into the messaging service. As the interface runs outside the messaging service itself, the values that are encrypted are never visible to the messaging service itself.

The commands output by the user-interface are secret_add 802 commands. When these commands are executed in the messaging service, they cause the values to be stored in the app definition database 106. A secret_list 803 command can be used to list the secrets in the current app that are stored in the app definition database 106.

A delimiter can be used in the key name of a key/value pair create a scoped secret value. For example, using a period as a delimiter, a secret value with the key "billing.myApiKey" would be scoped to the "billing" command set. In an alternative embodiment, the secret_create command can take an optional named command set parameter. In this case, the link output by the secret_create 801 command would include a parameter that caused the user-interface to create commands that scoped the secret_add 802 commands for the key/values pairs to the given command set.

In an embodiment, a parallel set of commands to the secret management commands exists to create unencrypted key/value pairs that may be scoped to command sets. A web based user-interface to handle unencypted key/value pairs would appear the same as the one in FIG. 9. In an alternative embodiment, the user-interface to create encrypted key/value pairs and unencryped key/value pairs would be merged into one interface.

External commands set can be set to include their own scope. In an embodiment, the definition of an external command set can include a scope:

scope: billing

When a scope is defined for an external command set, the commands in the set are only passed key/values in that scope along with any key/values that are global to the app when commands in the set are executed by the function computation system.

VIII. Local Command Development via Proxy

To aid the development of command sets, a developer 1001 can utilize a proxy development system that includes a development proxy 1005 that is part of the system and a developer proxy client process running on the developer's local machine 1002. The proxy development system allows a developer to develop and test command source code running on a machine external to the serverless function system. Using the proxy development system, a developer can issue textual commands in the messaging service 1003 that cause command source code to execute on an external machine 1002.

To utilize the proxy development system in an embodiment, a developer 1001 can run an administrative messaging command in the messaging service 1003:

/nf csm_localdev

Running the csm_localdev 808 command outputs a command the developer 1001 should run on their local machine that will run the developer proxy client 1002, giving it the path to a local command set definition file and a unique code. The developer proxy client can be written in a language such as Golang to allow a single client to be written that is portable across different platforms.

When run by the developer, the developer proxy client running on the developer's machine 1002 makes and maintains a network connection to the development proxy 1005 that is part of the system. When app commands are run in the messaging service 1003 that are not defined in the app definition database 1006, the system will contact the development proxy 1005 to attempt to execute the command. The development proxy 1005 then contacts the developer proxy client 1002 through its network connection to attempt to run the respective command. Communication between the function computation system 1004, development proxy 1005 and the developer's local machine running the developer proxy client 1002 utilizes the HTTPS protocol to ensure reliable and secure communication.

The developer proxy client 1002, running on the developer's local machine, can then check the local command set definition file to see if the given app command is defined in that file. The local command set definition file utilizes the same definition format as an external command set definition. If it is defined in the file and the associated command source location is known from the file, an attempt can be made to run the command locally by either running the command source from the system command line using an executor process, such as 'node' for JavaScript command source code or 'go' for Golang command source code, or by executing the source code using a lightweight serverless execution framework running on the developer's machine.

When the command source is run locally via the developer proxy client 1002, any response from the execution of the source code is returned to the development proxy 1005 which then returns the response back to the function computation system 1004 which, in turn, returns the response for output in the messaging service 1003. Using the proxy development system, a developer can develop new commands and their source code definitions locally and test them by running messing system commands in the messaging system 1003.

When local development of a set of commands is complete, the developer 1001 can issue a command in the messaging service 1003 to cause the local command set definition and associated local source code to be sent through the development proxy 1005 to the function computation system 1004. The command set definition can then be stored in the app definition database 1006 and command source code can be stored in the function storage associated with the function computation system 1004. The set of developed commands is then installed as an internal command set and any future execution of the commands will happen directly from the system without utilizing the proxy development system.

IX. Embodiment Variants

In the foregoing specification, possible embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In an embodiment, an apparatus comprises a processor and is configured to perform any of the foregoing methods.

In an embodiment, one or more non-transitory computer-readable storage media, storing software instructions, which when executed by one or more processors cause performance of any of the foregoing methods.

Note that, although separate embodiments are discussed herein, any combination of embodiments and/or partial embodiments discussed herein may be combined to form further embodiments.

Implementation Mechanism—Hardware Overview

According to one embodiment, the techniques described herein are implemented by one or more special-purpose computing devices. The special-purpose computing devices may be desktop computer systems, portable computer systems, handheld devices, smartphones, media devices, gaming consoles, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques.

Figure 11:
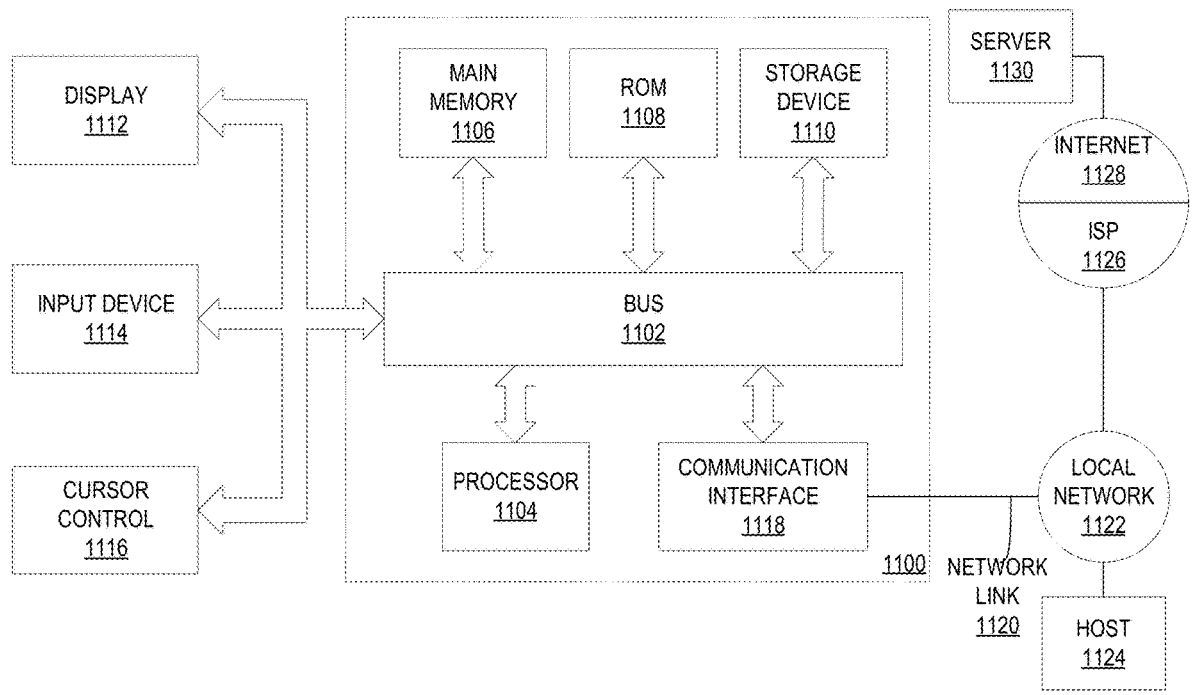
FIG. 11 is block diagram of a computer system upon which embodiments of the invention may be implemented.

FIG. 11 is a block diagram that illustrates a computer system 1100 utilized in implementing the above-described techniques, according to an embodiment. Computer system 1100 may be, for example, a desktop computing device, laptop computing device, tablet, smartphone, server appliance, computing mainframe, multimedia device, handheld device, networking apparatus, or any other suitable device.

Computer system 1100 includes one or more busses 1102 or other communication mechanism for communicating information, and one or more hardware processors 1104 coupled with busses 1102 for processing information. Hardware processors 1104 may be, for example, a general purpose microprocessor. Busses 1102 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 1100 also includes a main memory 1106, such as a random access memory (RAM) or other dynamic or volatile storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes one or more read only memories (ROM) 1108 or other static storage devices coupled to bus 1102 for storing static information and instructions for processor 1104. One or more storage devices 1110, such as a solid-state drive (SSD), magnetic disk, optical disk, or other suitable non-volatile storage device, is provided and coupled to bus 1102 for storing information and instructions.

Computer system 1100 may be coupled via bus 1102 to one or more displays 1112 for presenting information to a computer user. For instance, computer system 1100 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 1112 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 1112.

In an embodiment, output to display 1112 may be accelerated by one or more graphics processing unit (GPUs) in computer system 1100. A GPU may be, for example, a highly parallelized, multi-core floating point processing unit highly optimized to perform computing operations related to the display of graphics data, 3D data, and/or multimedia. In addition to computing image and/or video data directly for output to display 1112, a GPU may also be used to render imagery or other video data off-screen, and read that data back into a program for off-screen image processing with very high performance Various other computing tasks may be off-loaded from the processor 1104 to the GPU.

One or more input devices 1114 are coupled to bus 1102 for communicating information and command selections to processor 1104. One example of an input device 1114 is a keyboard, including alphanumeric and other keys. Another type of user input device 1114 is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane. Yet other examples of suitable input devices 1114 include a touch-screen panel affixed to a display 1112, cameras, microphones, accelerometers, motion detectors, and/or other sensors. In an embodiment, a network-based input device 1114 may be utilized. In such an embodiment, user input and/or other information or commands may be relayed via routers and/or switches on a Local Area Network (LAN) or other suitable shared network, or via a peer-to-peer network, from the input device 1114 to a network link 1120 on the computer system 1100.

A computer system 1100 may implement techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1110. Volatile media includes dynamic memory, such as main memory 1106. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid state drive of a remote computer. The remote computer can load the instructions into its dynamic memory and use a modem to send the instructions over a network, such as a cable network or cellular network, as modulated signals. A modem local to computer system 1100 can receive the data on the network and demodulate the signal to decode the transmitted instructions. Appropriate circuitry can then place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

A computer system 1100 may also include, in an embodiment, one or more communication interfaces 1118 coupled to bus 1102. A communication interface 1118 provides a data communication coupling, typically two-way, to a network link 1120 that is connected to a local network 1122. For example, a communication interface 1118 may be an integrated services digital network (ISDN) card, cable modem, satellite modem, or a modem to provide a data communication connection to a corresponding type of telephone line. As another example, the one or more communication interfaces 1118 may include a local area network (LAN) card to provide a data communication connection to a compatible LAN. As yet another example, the one or more communication interfaces 1118 may include a wireless network interface controller, such as a 802.11-based controller, Bluetooth controller, Long Term Evolution (LTE) modem, and/or other types of wireless interfaces. In any such implementation, communication interface 1118 sends and receives electrical, electromagnetic, or optical signals that carry digital data streams representing various types of information.

Network link 1120 typically provides data communication through one or more networks to other data devices. For example, network link 1120 may provide a connection through local network 1122 to a host computer 1124 or to data equipment operated by a Service Provider 1126. Service Provider 1126, which may for example be an Internet Service Provider (ISP), in turn provides data communication services through a wide area network, such as the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

In an embodiment, computer system 1100 can send messages and receive data, including program code and/or other types of instructions, through the network(s), network link 1120, and communication interface 1118. In the Internet example, a server 1130 might transmit a requested code for an application program through Internet 1128, ISP 1126, local network 1122 and communication interface 1118. The received code may be executed by processor 1104 as it is received, and/or stored in storage device 1110, or other non-volatile storage for later execution. As another example, information received via a network link 1120 may be interpreted and/or processed by a software component of the computer system 1100, such as a web browser, application, or server, which in turn issues instructions based thereon to a processor 1104, possibly via an operating system and/or other intermediate layers of software components.

In an embodiment, some or all of the systems described herein may be or comprise server computer systems, including one or more computer systems 1100 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third-party entities, on behalf of another entity for whom the components are deployed. In other embodiments, however, the described systems may be implemented entirely by computer systems owned and operated by a single entity.

In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the invention have been described with reference to numerous specific details that may vary from implementation to implementation. Thus, the sole and exclusive indicator of what is the invention and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
   receiving, at a messaging server, a user textual message, the user textual message comprised of a command prefix and one or more subcommands;
   determining an API endpoint associated with a first subcommand of the one or more subcommands and the command prefix;
   routing one or more parameters from the user textual message to the API endpoint;
   receiving the one or more parameters at the API endpoint;
   executing a serverless function within an isolation container in response to the received one or more parameters by executing function code using one or more associated function source code locations;
   returning a result of the execution of the serverless function to the messaging server.

2. The method as recited in claim 1, further comprising:
   retrieving the function code by referring to an app definition associated with the user textual message;
   selecting a compute server based on the user textual message;
   causing the selected compute server to execute the function code.

3. The method as recited in claim 2, further comprising:
   storing a plurality of app definitions;
   wherein each app definition includes a mapping of user textual message subcommands to function code.

4. The method as recited in claim 2, wherein an app is associated with a user textual message command prefix.

5. The method as recited in claim 1, wherein an app is associated with a user textual message command prefix, and wherein an app is comprised of one or more subcommands.

6. The method as recited in claim 1, wherein an app is associated with a user textual message command prefix, wherein an app is comprised of one or more subcommands, and wherein each of the one or more subcommands is mapped to one or more functions.

7. The method as recited in claim 1, further comprising:
   storing a history of functions that were executed by users and identities of the users.

8. One or more non-transitory computer-readable storage media, storing one or more sequences of instructions, which when executed by one or more processors cause performance of:
   receiving, at a messaging server, a user textual message, the user textual message comprised of a command prefix and one or more subcommands;
   determining an API endpoint associated with a first subcommand of the one or more subcommands and the command prefix;
   routing one or more parameters from the user textual message to the API endpoint;
   receiving the one or more parameters at the API endpoint;
   executing a serverless function within an isolation container in response to the received one or more parameters by executing function code using one or more associated function source code locations;
   returning a result of the execution of the serverless function to the messaging server.

9. The one or more non-transitory computer-readable storage media as recited in claim 8, further comprising:
   retrieving the function code by referring to an app definition associated with the user textual message;
   selecting a compute server based on the user textual message;
   causing the selected compute server to execute the function code.

10. The one or more non-transitory computer-readable storage media as recited in claim 9, further comprising:
    storing a plurality of app definitions;
    wherein each app definition includes a mapping of user textual message subcommands to function code.

11. The one or more non-transitory computer-readable storage media as recited in claim 9, wherein an app is associated with a user textual message command prefix.

12. The one or more non-transitory computer-readable storage media as recited in claim 8, wherein an app is associated with a user textual message command prefix, and wherein an app is comprised of one or more subcommands.

13. The one or more non-transitory computer-readable storage media as recited in claim 8, wherein an app is associated with a user textual message command prefix, wherein an app is comprised of one or more subcommands, and wherein each of the one or more subcommands is mapped to one or more functions.

14. The one or more non-transitory computer-readable storage media as recited in claim 8, further comprising:
    storing a history of functions that were executed by users and identities of the users.

15. A system, comprising:
    a messaging server, implemented at least partially in hardware, configured to:
       receive a user textual message, the user textual message comprised of a command prefix and one or more subcommands;
       determine an API endpoint associated with a first subcommand of the one or more subcommands and the command prefix; and
       route one or more parameters from the user textual message to the API endpoint;
    a function computation system, implemented at least partially in hardware, configured to:
       receive the one or more parameters at the API endpoint;
       execute a serverless function within an isolation container in response to the received one or more parameters by executing function code using one or more associated function source code locations; and return a result of the execution of the serverless function to the messaging server.

16. The system as recited in claim 15, wherein the function computation system is further configured to:
retrieve the function code by referring to an app definition associated with the user textual message;
select a compute server based on the user textual message;
cause the selected compute server to execute the function code.

17. The system as recited in claim 16, wherein the messaging server is further configured to:
store a plurality of app definitions;
wherein each app definition includes a mapping of user textual message subcommands to function code.

18. The system as recited in claim 16, wherein an app is associated with a user textual message command prefix.

19. The system as recited in claim 15, wherein an app is associated with a user textual message command prefix, and wherein an app is comprised of one or more subcommands.

20. The system as recited in claim 15, wherein an app is associated with a user textual message command prefix, wherein an app is comprised of one or more subcommands, and wherein each of the one or more subcommands is mapped to one or more functions.

* * * * *